J. M. Woodcock.
Horse Rake.
Nº 36928. Patented Nov. 11, 1862.
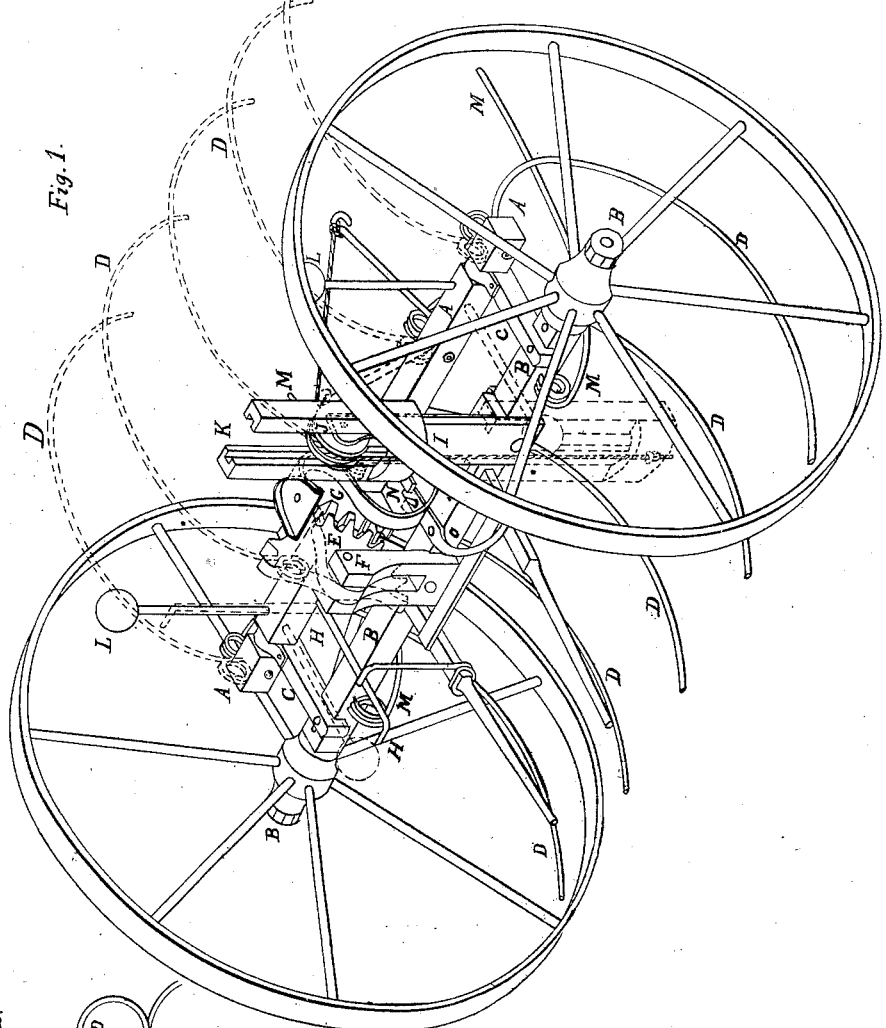
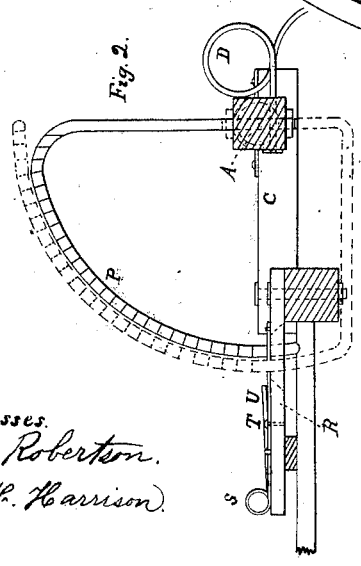
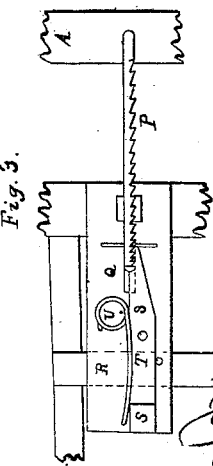
Witnesses.
G. Robertson.
Wm. H. Harrison.
Inventor.
J. M. Woodcock
by C. A. Rulok
his atty.

UNITED STATES PATENT OFFICE.

JAMES M. WOODCOCK, OF BRIDGEPORT, OHIO.

IMPROVEMENT IN HORSE-RAKES.

Specification forming part of Letters Patent No. 36,928, dated November 11, 1862.

*To all whom it may concern:*

Be it known that I, JAMES M. WOODCOCK, of Bridgeport, in the county of Belmont and State of Ohio, have invented a new and useful Improvement in the Horse Hay-Rake; and I hereby declare that the following is a full, clear, and exact description of the construction and operation of the same, reference being had to the annexed drawings, forming part of this specification, in which—

Figure 1 is an isometrical perspective view of a horse hay-rake constructed according to the principles of my invention, and representing it with the tooth-bar in two positions—*i. e.*, when gathering the hay, as shown in black lines, and when elevated to have the teeth cleared of the hay accumulated therein, as shown in red lines. Figs. 2 and 3 are respectively side and plan views of a device for locking and unlocking the tooth-bar in such position as may be necessary for the performance of its work.

This invention relates to hay-rakes which operate to rake at intervals determined at will of the operator, so as to leave it in windrows; and its nature consists in a certain combination of devices to effect these objects in a more efficient manner and with greater facility than those heretofore in use.

Horse-rakes now generally in use are defective in failing to elevate the circular teeth sufficiently high to prevent the hay from being scattered when being gathered. Moreover, the method heretofore employed of elevating the tooth-bar or rake-head is uncertain and difficult in its operation; and whereas difficulties also occur by circular teeth rolling the hay in the act of raking, thereby rendering it difficult and inconvenient to load or form the hay into cocks; now, therefore, this my invention has for its object to obviate these difficulties, the details, construction, and operation being as follows:

My rake, in its general construction, is similar to other rakes, having wheels, an axle, rake-head, circular elastic teeth, &c.

In building my rake I place the rake-head A six inches (more or less) in rear of the axle B and support and confine it there by arms C, secured to the axle horizontally, with cavities in them to receive the corresponding bearings near the ends of the rake-head. In this rake-head I fasten teeth D, coiled and curved similar to teeth in other rakes. For elevating and depressing the teeth I use two cog-segments. The larger or driving one, E, I place over the axle by means of forked standard F, fastened to the axle, in which standard I suspend the segment by bearings on it, or by a shaft passing through it and the segment. The smaller segment, G, I place on the rake-head, so as to gear into the larger one, and with a lever or crank, H, I turn the segment, and thereby elevate the teeth higher and with greater dispatch than on other rakes. But as operating the rake in this manner would be laborious to the operator unaided, I employ two devices to assist in elevating the teeth, using but one at a time, however. The first is constructed and operated as follows: I secure to the axle perpendicularly a guide-post, I, with continuous projections on its side edges, at the top of which I attach a pulley, J, in the usual manner. I also make a sliding weight, K, as long as the guide-post, open in the center from its top to near the bottom, and grooved along its inner sides to correspond with the projections on the guide-post. This weight is so constructed at the bottom as to allow it to pass up and down the guide-post freely, and is made to about balance the teeth. To its lower end I attach a rope, passing thence over the pulley to an arm or lever fastened to the rake-head, by which means the weight is suspended and controlled in passing up and down.

My second device for elevating the teeth is described as follows: I attach to the rake-head one or more arms perpendicularly, at the top end of which I fasten balls or weights L, sufficiently heavy to about balance the teeth, so that when the arms are out of that line the weight will gravitate and assist the teeth to rise. With this method the teeth may be elevated by a lever fastened to the rake-head. By these means I so lessen the labor that a small boy can operate the rake.

To prevent the hay from rolling and to cast it from the teeth when elevated, I make dischargers M, of wire sufficiently heavy and elastic to effect these objects. They are so coiled near where they are fastened into the axle, and are so curved and pitched downward, that they press upon the hay and prevent it from rolling, and will also rise as the hay accumulates and cast it from the teeth, so that it cannot spread as the teeth pass over it.

For locking the teeth while raking, I attach to the rake-head an arm N, extending part way to the axle, and attached to the axle by a bolt passing through it and the axle. I have another arm, O, curved about a quarter-circle, with one end extending under and little past the arm on the rake-head and the other end extending over the cross-bar of the shafts, so that the operator can, by pressing his foot against it, disconnect its other end from the arm of the rake-head. For the purpose of forcing the curved arm to its place after being thus disconnected I use a spring made in some convenient manner.

The locking device last herein described is susceptible of many modifications. I would therefore not confine myself to the precise construction and arrangement or combination of device specified. To illustrate this I have shown in Figs. 2 and 3 a locking device which may be used in lieu of the one described, and which, on account of its lightness, cheapness, facility and perfection of operation, particularly over uneven ground, may prove in many instances preferable. The device referred to consists of an iron arm, P, fastened to the rake-head and curved so that it will pass over or under the axle, according to the shape and inclination of the teeth on the curved arm or ratchet-bar, and extend up or down through the mortise Q in a plate, R, resting on the axle and cross-bar of the shafts. The ratchet hooks or teeth on the curved bar, passing through the mortise, receive the latch or catch S. This check is a flat piece of iron secured to the plate by a bolt, T, passing through it near the middle, so that the arm can play in and out of the hooks. This check is forced in the hooks or teeth by a spring, U, pressing against one end, and is thrown out by the foot of the operator. By this means uneven surfaces can be raked better than by any stationary lock.

I claim—

1. The combination of weights with the rake-bar, so that the teeth may be lifted with ease off from the ground, or may be operated automatically, substantially in the manner as herein shown and set forth.

2. The use of spring clearers or dischargers in combination with spring rake-teeth, the two being arranged to operate in conjunction with each other in the manner and for the purpose set forth.

3. The herein-described device for locking at any required elevation from the ground of the rake-bar, the same consisting of a curved ratchet-bar fast on and movable with the tilting rake-bar, in combination with a mortise and spring-latch fast on the axle, the said parts being arranged as described, to operate in the manner herein set forth.

In testimony whereof I have signed my name to this specification before two subscribing witnesses.

JAMES M. WOODCOCK.

Witnesses:
OSCAR GEMMER,
GEORGE KULINE.